United States Patent
Husband et al.

(10) Patent No.: US 12,392,251 B2
(45) Date of Patent: Aug. 19, 2025

(54) DIAMETRICALLY EXPANDABLE/COLLAPSIBLE PISTON SEAL

(71) Applicant: RAYTHEON TECHNOLOGIES CORPORATION, Farmington, CT (US)

(72) Inventors: Jason B. Husband, South Glastonbury, CT (US); Canio Michael Hoffarth, Wadde, AZ (US); Philip Andrew Varney, Coventry, CT (US)

(73) Assignee: RTX CORPORATION, Farmington, CT (US)

( * ) Notice: Subject to any disclaimer, the term of this patent is extended or adjusted under 35 U.S.C. 154(b) by 7 days.

(21) Appl. No.: 18/348,285

(22) Filed: Jul. 6, 2023

(65) Prior Publication Data

US 2025/0012197 A1    Jan. 9, 2025

(51) Int. Cl.
  *F01D 11/00*    (2006.01)

(52) U.S. Cl.
  CPC .......... *F01D 11/006* (2013.01); *F01D 11/005* (2013.01); *F05D 2230/60* (2013.01); *F05D 2240/55* (2013.01)

(58) Field of Classification Search
  CPC .... F01D 11/003; F01D 11/005; F01D 11/006; F05D 2230/60; F05D 2240/55; F05D 2240/58; F05D 2250/15; F16J 9/067; F16J 9/08; F16J 9/12; F16J 9/20; F16J 15/027; F16J 15/0887; F16J 15/0893; F16J 15/164; F16J 15/3268; F16J 15/441; F16J 15/46; F16J 19/067
  See application file for complete search history.

(56) References Cited

U.S. PATENT DOCUMENTS

| | | | |
|---|---|---|---|
| 1,596,691 A | 8/1926 | Solenberger | |
| 2,262,311 A | * 11/1941 | Zahodiakin | F16J 9/206 277/465 |
| 3,212,785 A | 10/1965 | Hamm | |
| 3,459,432 A | * 8/1969 | Reussner | F01M 11/00 277/460 |
| 3,697,090 A | 10/1972 | Brenneke | |
| 3,735,992 A | 5/1973 | Prostorov et al. | |

(Continued)

FOREIGN PATENT DOCUMENTS

FR    1123357 A  *  9/1956  ............... F16J 9/067

OTHER PUBLICATIONS

Partial European Search Report for European Patent Application No. 24187240.7 mailed Nov. 18, 2024.

(Continued)

*Primary Examiner* — Woody A Lee, Jr.
*Assistant Examiner* — Jesse M Prager
(74) *Attorney, Agent, or Firm* — Carlson, Gaskey & Olds, P.C.

(57) ABSTRACT

A gas turbine engine includes a rotor that has a seal surface and a shaft that is rotatable about an engine central axis. The shaft has an annular seal channel that opens to the seal surface. There is a seal for sealing against the seal surface. The seal has channels formed therein that define a tortuous seal wall with interconnected spring ligaments such that the seal is elastically diametrically expandable for installation clearance around the shaft and, once on the shaft, elastically diametrically collapsible into the annular seal channel.

12 Claims, 5 Drawing Sheets

(56) References Cited

U.S. PATENT DOCUMENTS

| | | | |
|---|---|---|---|
| 4,359,229 A | 11/1982 | Cattaneo | |
| 11,028,713 B2* | 6/2021 | Webb | F16J 15/3464 |
| 2008/0265518 A1* | 10/2008 | Fujioka | F16J 9/28 |
| | | | 277/477 |
| 2021/0040892 A1 | 2/2021 | Stoyanov et al. | |

OTHER PUBLICATIONS

European Search Report for European Patent Application No. 24187240.7 mailed Feb. 10, 2025.

* cited by examiner

DIAMETRICALLY EXPANDABLE/COLLAPSIBLE PISTON SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A gas turbine engine according to an example of the present disclosure includes a rotor that has a seal surface, and a shaft that is rotatable about an engine central axis. The shaft has an annular seal channel that opens to the seal surface, and a seal for sealing against the seal surface. The seal has channels formed therein that define a tortuous seal wall with interconnected spring ligaments such that the seal is elastically diametrically expandable for installation clearance around the shaft and, once on the shaft, elastically diametrically collapsible into the annular seal channel.

In a further embodiment of any of the foregoing embodiments, the seal is metallic.

In a further embodiment of any of the foregoing embodiments, the seal is a full hoop.

In a further embodiment of any of the foregoing embodiments, the seal has first and second opposed axial faces, and the channels are axial through-channels that open at each of the first and second opposed axial faces.

In a further embodiment of any of the foregoing embodiments, the seal has radially inner and outer faces and an annular groove that opens at the radially inner face.

A further embodiment of any of the foregoing embodiments includes a flexible sealant disposed in the channels and the annular groove. The flexible sealant seals the channels with respect to flow between the first and second opposed axial faces.

In a further embodiment of any of the foregoing embodiments, the flexible sealant includes silicone or fluoropolymer.

In a further embodiment of any of the foregoing embodiments, the channels are unbranched.

In a further embodiment of any of the foregoing embodiments, the channels are helical.

In a further embodiment of any of the foregoing embodiments, the channels are branched.

A seal for a gas turbine engine according to an example of the present disclosure includes a metallic tortuous seal wall with interconnected spring ligaments such that the seal is elastically diametrically expandable and elastically diametrically collapsible.

In a further embodiment of any of the foregoing embodiments, the tortuous seal wall is metallic.

In a further embodiment of any of the foregoing embodiments, the seal has first and second opposed axial faces, and the channels are axial through-channels that open at each of the first and second opposed axial faces.

In a further embodiment of any of the foregoing embodiments, the seal has radially inner and outer faces and an annular groove that opens at the radially inner face.

A further embodiment of any of the foregoing embodiments includes a flexible sealant disposed in the channels and the annular groove. The flexible sealant seals the channels with respect to flow between the first and second opposed axial faces.

In a further embodiment of any of the foregoing embodiments, the channels are unbranched.

In a further embodiment of any of the foregoing embodiments, the channels are helical.

In a further embodiment of any of the foregoing embodiments, the channels are branched.

A method of assembling a seal into a gas turbine engine according to an example of the present disclosure includes providing a seal as in any of the preceding embodiments, applying an expanding force to the seal to elastically diametrically expand the seal, moving the seal over a shaft and into an annular seal channel of the shaft, and then releasing the expanding force from the seal such that the seal elastically diametrically collapses into the annular seal channel.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
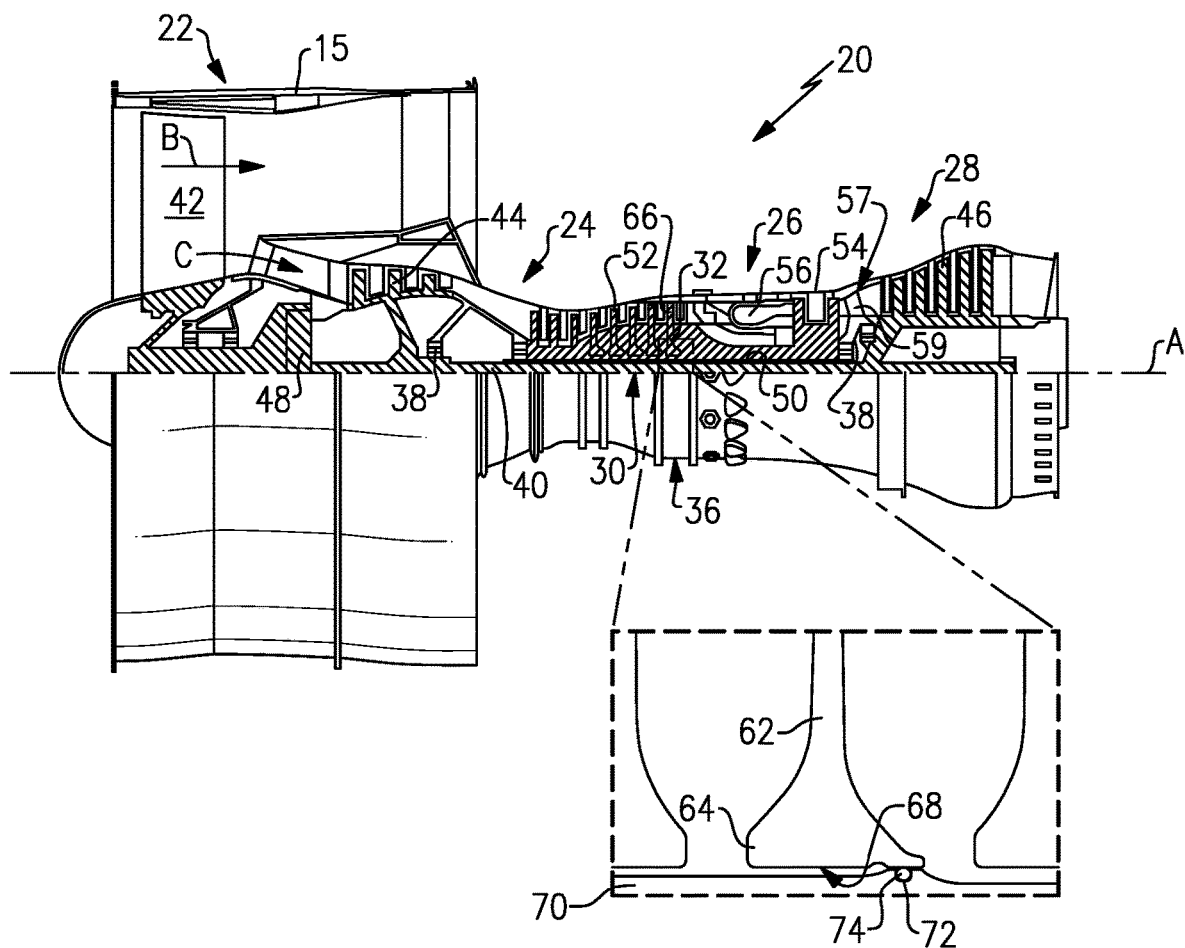
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

The high pressure compressor 52 includes a rotor 62 that has a bore portion 64 (shown in FIG. 1 inset). In this example, the rotor 62 carries rotor blades 66, which may be integral with the rotor 62 or mechanically attached to the rotor 62. It is to be understood, however, that in other examples the rotor 62 may not have blades. The bore portion 64 defines a seal surface 68. In this example, the seal surface 68 is in a central bore of the rotor 62, but it could alternatively be on a flange or arm that extends from the rotor 62. A shaft 70 extends through the bore. The shaft 70 may be part of the high speed spool 32. The rotor 62 and the shaft 70 are rotatable in the same direction about the engine central axis A.

The shaft 70 defines an annular seal channel 72 that opens to the seal surface 68. There is a seal 74 disposed in the channel 72 for sealing against the seal surface 68. The seal 74 may also be considered to be a piston seal. When the engine 20 is running, there is a pressure differential between the upstream and downstream regions of the rotor 62. The seal 74 facilitates isolating those pressure regions from each other.

Figure 2:
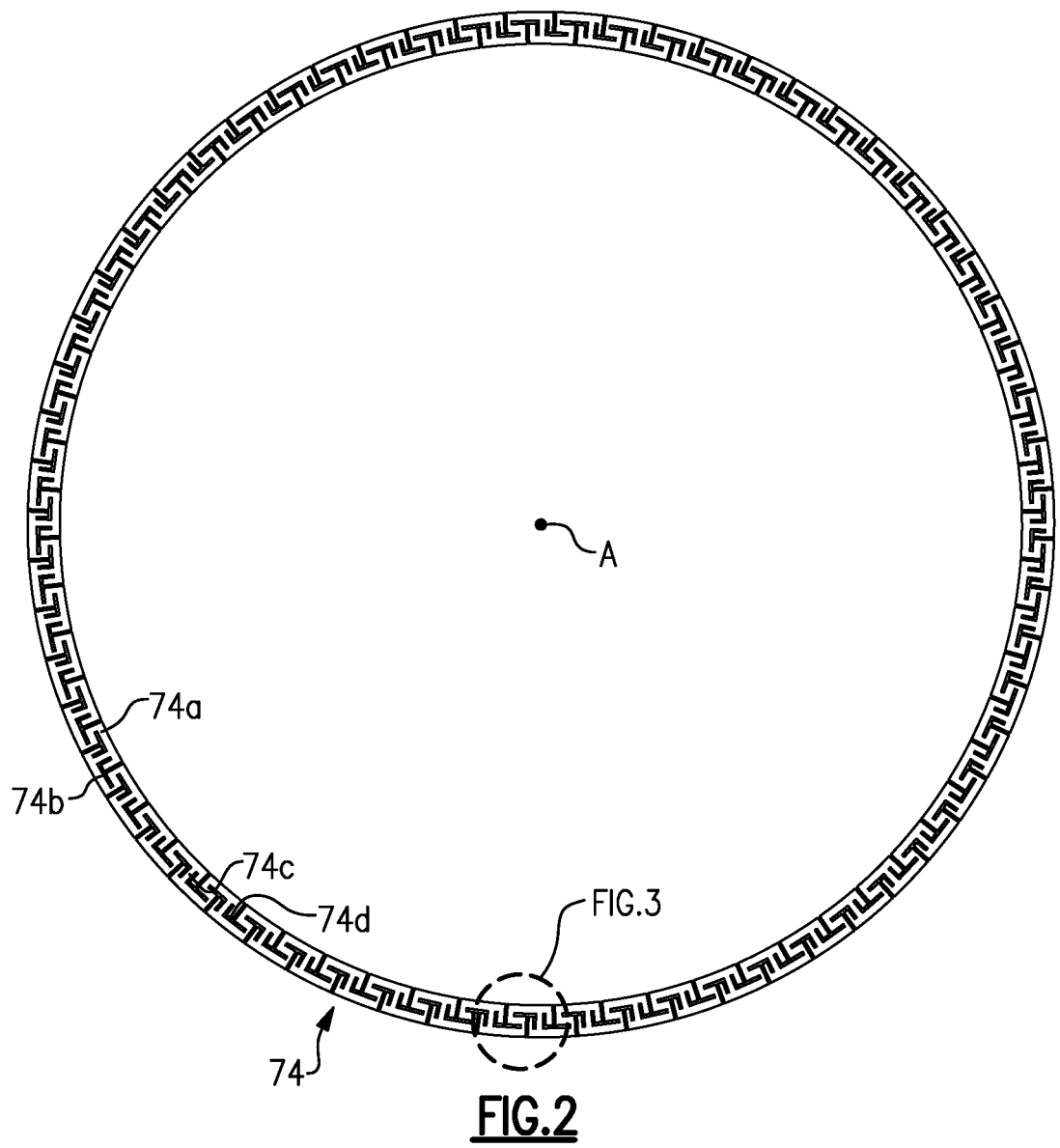
FIG. 2 illustrates a diametrically expandable/collapsible seal.

FIG. 2 illustrates an isolated view of the seal 74. As shown, the seal 74 is a full hoop structure. A "full hoop structure" is a continuous ring that has no mechanical joints. The seal 74 is formed of a metallic alloy, such as but not limited to, steel. The seal 74 defines radially inner and outer faces 74a/74b, and first and second opposed axial faces 74c/74d.

Figure 3:
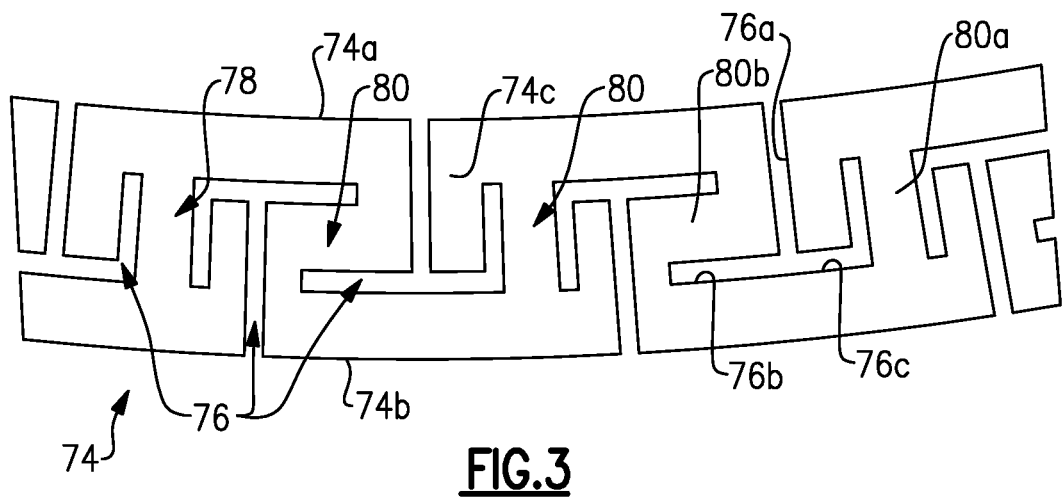
FIG. 3 illustrates a section of the seal.
Figure 4:
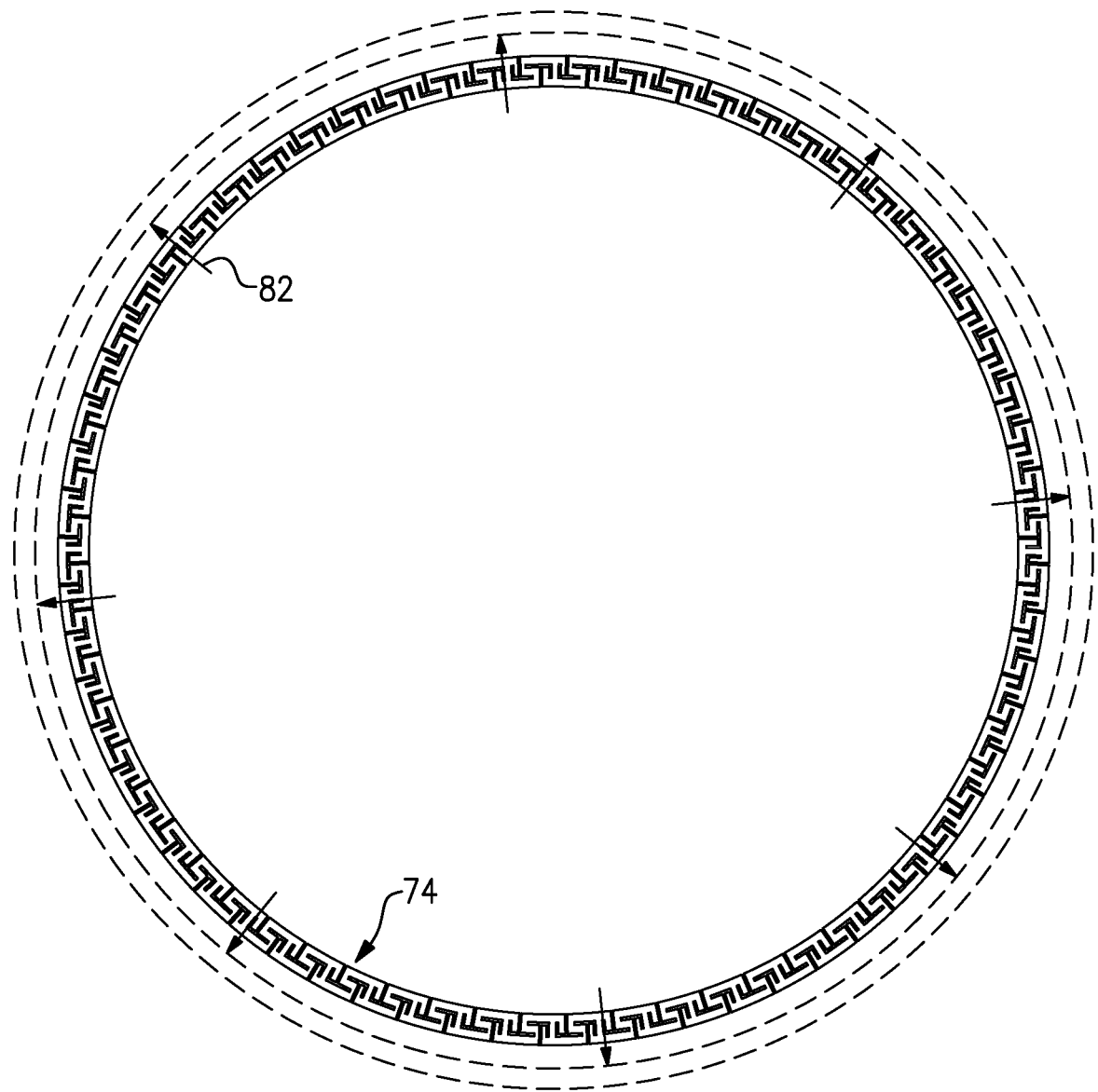
FIG. 4 illustrates expansion of the seal.

FIG. 3 illustrates a representative section of the seal 74. The seal 74 has channels 76 formed therein. The channels 76 are axial through-channels that open at each of the first and second opposed axial faces 74a/74b. The channels 76 define a tortuous seal wall 78 with interconnected spring ligaments 80. The spring ligaments 80 are elastically flexible such that the seal 74 is elastically diametrically expandable for installation clearance around the shaft 70 and, once on the shaft 70, elastically diametrically collapsible into the annular seal channel 72. For example, as shown in FIG. 4, when a radial expanding force (represented by radial arrows 82) is applied to the seal 74, the seal diametrically expands to a larger diameter. For instance, the spring ligaments 80 elastically deflect under the expanding force, allowing the sides of the channels 76 to move apart such that the channels 76 widen. The collective widening of the channels 76 yields a corresponding increase in the diameter of the seal 74 from its initial diameter. As long as the seal 74 is not expanded beyond the elastic limits of the spring ligaments 80, which would cause permanent deformation, the seal 74 upon release of the expanding force will rebound to diametrically collapse to its initial diameter.

The degree to which the seal 74 can be diametrically expanded can be modified by the chosen configuration of the channels 76. In the illustrated example (FIG. 3), the channels are branched. For instance, each channel 76 initiates at either the radially inner or outer face 74a/74b and includes a first channel section 76a that extends toward the diametric centerline of the seal 74. In the radially intermediate region of the seal 74 the first channel section 76a splits into two branch channels 76b/76c, each extending in an opposite circumferential direction from the other. The branch 76b terminates and the branch 76c turns back toward the face 74a/74b at which the channel 76 initiated. The branches 76b of adjacent channels 76 radially overlap. Such a configuration creates radially- and circumferentially-oriented spring ligaments 80a/80b for a relatively more rigid elastic response.

Figure 5:
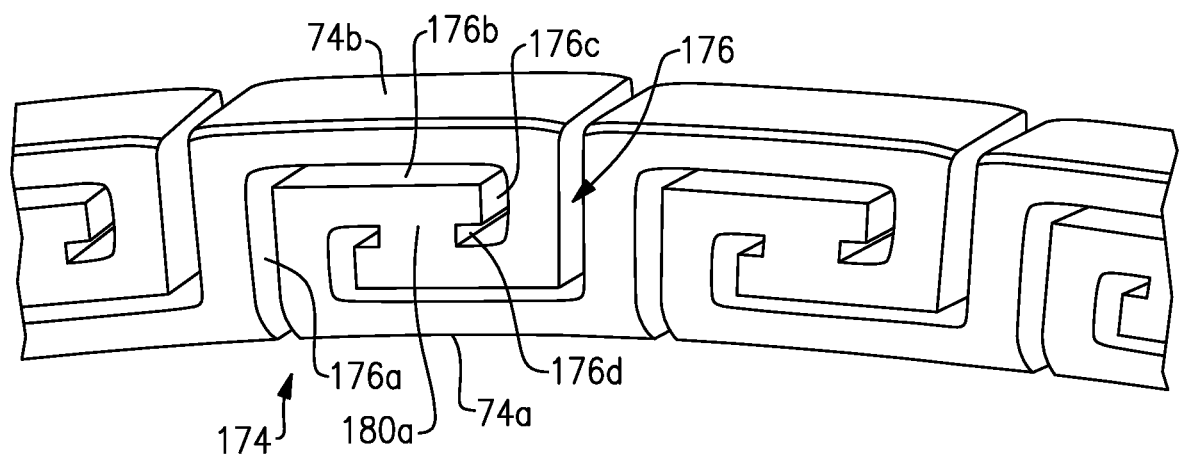
FIG. 5 illustrates a section of another example seal with helical channels.

FIG. 5 illustrates a representative section of another seal 174 that has a different configuration. In this example, the channels 176 are unbranched and are helical. For instance, each channel 176 initiates at either the radially inner or outer face 74a/74b and includes a first channel section 176a that extends toward the diametric centerline of the seal 174 and then turns circumferentially to channel section 176b. Channel section 176b then turns to channel section 176c radially back toward the radially inner or outer face 74a/74b at which the channel 176 initiated. The channel section 176c then turns circumferentially to terminal channels section 176d. The channel sections 176a/176b/176c/176d thus collectively form the helical shape. Each helical channel 176 forms a channel pair with an adjacent channel 176 that is circumferentially oppositely oriented such that the two channels 176 in the channel pair radially overlap. Such a configuration creates a single radially-oriented spring ligament 180a for a relatively less rigid elastic response in comparison to the configuration of the seal 74 above. As will be appreciated, the number of channels 76/176, width of the channels 76/176, and spacing of the channels 76/176 may be modified along with the channel configuration to further adjust the elastic response.

Figure 6:
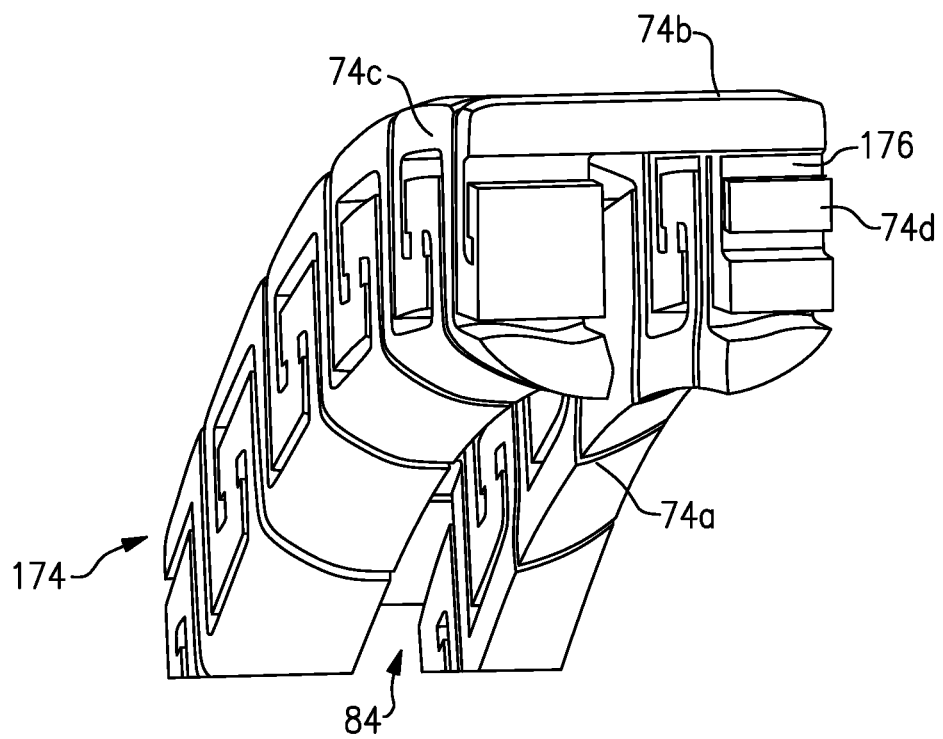
FIG. 6 illustrates a sectioned view of the seal of FIG. 5.
Figure 7:
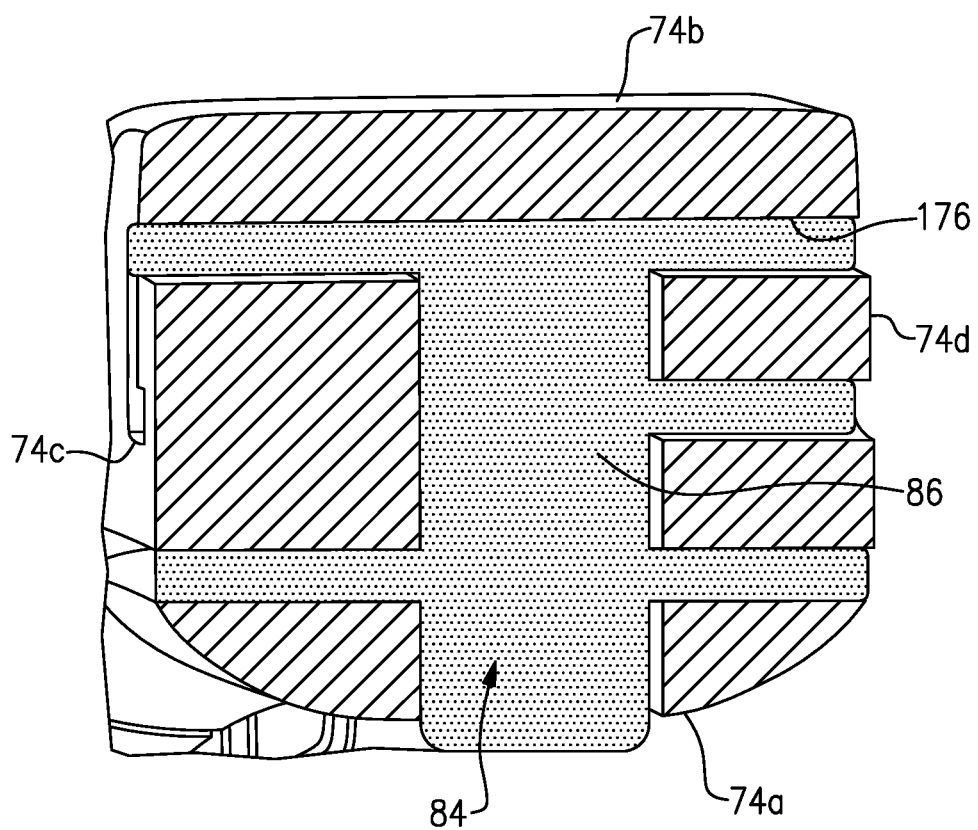
FIG. 7 illustrates the seal with a flexible sealant.

FIG. 6 illustrates a further example of the seal 174, but the example is also applicable to the seal 74. As shown, the seal 174 includes an annular groove 84 that opens at the radially inner face 74a. As shown in FIG. 7, there is a flexible sealant 86 disposed in the channels 176 and the annular groove 84. As indicated above, when the engine 20 is running, there is a pressure differential between the upstream and downstream regions of the rotor 62 and the seal 74 isolates those pressure regions from each other. In that regard, the seal 174 must block air flow across the seal in the axial direction from one axial face to the other 74a/74b. As the channels 176 are through-channels, the flexible sealant 86 serves to seal off the channels 176 with respect to flow between the opposed axial faces 74/74b. The annular groove 84 serves to facilitate mechanically anchoring the flexible sealant 86 in the seal 174, as well as aiding in distributing the flexible sealant 86 during installation. For instance, the flexible sealant is initially in an uncured state in which it can flow into and along the groove 84 to fill the channels 176 before curing/immobilizing. For instance, the flexible sealant 86 includes silicone, such as a silicone caulking, or a fluoropolymer.

A method of assembling the seal 74/174 into a gas turbine engine 20 includes providing the seal 74/174 as described above (e.g., either as a pre-fabricated component or by fabricating the seal 74/174). An expanding force is then applied to the seal 74/174 to elastically diametrically expand the seal (see FIG. 2) to a sufficient diameter at which there is a clearance around the shaft 70. The expanding force is provided manually, but may alternatively may be automated. The expanded seal 74/174 is then moved over the shaft 70 to the location of the annular seal channel 72. The expanding force is then released such that the seal 74/174 elastically diametrically collapses into the annular seal channel 72. The flexible sealant 86 is then injected into the annular groove 84 and channels 76/176. Upon operation of the engine 20, the seal 74/174 is centrifugally pulled radially outwardly into sealing contact with the seal surface 68.

The seals 74/174 herein can be fabricated by wire electrical discharge machining (wire EDM) but are not limited thereto. For example, starting with a solid metallic ring, wire EDM is initiated at either the radially inner or outer face 74a/74b to cut the channels 76/176. In one example, the channels 76/176 are cut to a width of approximately 250 micrometers, though wider or narrower widths can be used to tailor to elastic response of the seal 74/174. Other processes, such as additive manufacturing and 3D printing, are also contemplated.

In comparison to a split seal, the seals 74/174 facilitate enhanced performance. For instance, the rigidity of a split seal varies from the location of the split such that the split seal asymmetrically deflects under centrifugal forces. This can create locationally varied leaks, asymmetric thermal loads, asymmetric vibration, and asymmetric seal loads/friction, all of which can debit sealing performance and durability. However, the seals 74/174 do not have a split and can therefore symmetrically deflect, which facilitates symmetric leakage and concomitant symmetric thermal loads, symmetric vibrations, and symmetric seal loads/friction, all of which can improve sealing performance and durability.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
a rotor having a seal surface;
a shaft rotatable about an engine central axis, the shaft having an annular seal channel that opens to the seal surface;
a seal for sealing against the seal surface, the seal having first and second opposed axial faces, the seal having channels formed therein, radially inner and outer faces, and an annular groove that opens at the radially inner face, the channels are axial through-channels that open at each of the first and second opposed axial faces, and the channels define a tortuous seal wall with interconnected spring ligaments such that the seal is elastically diametrically expandable for installation clearance around the shaft and, once on the shaft, elastically diametrically collapsible into the annular seal channel; and
a flexible sealant disposed in the channels and the annular groove, the flexible sealant sealing the channels with respect to flow between the first and second opposed axial faces.

2. The gas turbine engine as recited in claim 1, wherein the seal is metallic.

3. The gas turbine engine as recited in claim 1, wherein the seal is a full hoop.

4. The gas turbine engine as recited in claim 1, wherein the flexible sealant includes silicone or fluoropolymer.

5. The gas turbine engine as recited in claim 1, wherein the channels are unbranched.

6. A gas turbine engine comprising:
a rotor having a seal surface;
a shaft rotatable about an engine central axis, the shaft having an annular seal channel that opens to the seal surface; and
a seal for sealing against the seal surface, the seal having channels formed therein that define a tortuous seal wall with interconnected spring ligaments such that the seal is elastically diametrically expandable for installation clearance around the shaft and, once on the shaft, elastically diametrically collapsible into the annular seal channel, wherein the channels are helical.

7. The gas turbine as recited in claim 1, wherein the channels are branched.

8. A seal for a gas turbine engine, comprising:
a metallic tortuous seal wall having first and second opposed axial faces, channels formed in the metallic tortuous seal wall, radially inner and outer faces, and an annular groove that opens at the radially inner face, the channels are axial through-channels that open at each of the first and second opposed axial faces, and the metallic tortuous seal wall having interconnected spring ligaments such that the seal is elastically diametrically expandable and elastically diametrically collapsible, and a flexible sealant disposed in the channels and the annular groove, the flexible sealant sealing the channels with respect to flow between the first and second opposed axial faces.

9. The seal as recited in claim 8, wherein the channels are unbranched.

10. The seal as recited in claim 9, wherein the channels are helical.

11. The seal as recited in claim 8, wherein the channels are branched.

12. A method of assembling a seal into a gas turbine engine, the method comprising:
providing a metallic tortuous seal wall with interconnected spring ligaments such that the seal is elastically diametrically expandable and elastically diametrically collapsible, the metallic tortuous seal wall having first and second opposed axial faces, channels formed in the metallic tortuous seal wall, radially inner and outer faces, and an annular groove that opens at the radially inner face, the channels are axial through-channels that open at each of the first and second opposed axial faces, and the metallic tortuous seal wall having interconnected spring ligaments such that the seal is elastically diametrically expandable and elastically diametrically collapsible, and a flexible sealant disposed in the channels and the annular groove, the flexible sealant sealing the channels with respect to flow between the first and second opposed axial faces;
applying an expanding force to the seal to elastically diametrically expand the seal, and then moving the seal over a shaft and into an annular seal channel of the shaft; and
releasing the expanding force from the seal such that the seal elastically diametrically collapses into the annular seal channel.

* * * * *